(12) United States Patent
Wang et al.

(10) Patent No.: US 9,880,733 B2
(45) Date of Patent: Jan. 30, 2018

(54) MULTI-TOUCH REMOTE CONTROL METHOD

(71) Applicants: Yu Albert Wang, San Diego, CA (US); Robin Cheung, San Diego, CA (US)

(72) Inventors: Yu Albert Wang, San Diego, CA (US); Robin Cheung, San Diego, CA (US)

(*) Notice: Subject to any disclaimer, the term of this patent is extended or adjusted under 35 U.S.C. 154(b) by 120 days.

(21) Appl. No.: 14/623,874

(22) Filed: Feb. 17, 2015

(65) Prior Publication Data

US 2016/0239201 A1 Aug. 18, 2016

(51) Int. Cl.
*G06F 3/0488* (2013.01)
*G06F 3/041* (2006.01)
*H04N 21/422* (2011.01)
*G06F 3/0354* (2013.01)
*G06F 3/01* (2006.01)
*G06F 3/038* (2013.01)

(52) U.S. Cl.
CPC ......... *G06F 3/04883* (2013.01); *G06F 3/038* (2013.01); *G06F 3/03547* (2013.01); *G06F 3/041* (2013.01); *G06F 3/0416* (2013.01); *G06F 2203/0381* (2013.01); *G06F 2203/04808* (2013.01); *H04N 21/42224* (2013.01)

(58) Field of Classification Search
CPC ...... G06F 3/041; G06F 3/0416; G06F 3/0485; G06F 3/0488; G06F 3/04883
See application file for complete search history.

(56) References Cited

U.S. PATENT DOCUMENTS

| | | | |
|---|---|---|---|
| 2011/0025642 A1* | 2/2011 | Tada | G06F 3/0416 345/174 |
| 2012/0212420 A1* | 8/2012 | Shin | G06F 3/04883 345/173 |
| 2013/0328617 A1* | 12/2013 | Liu | G06F 3/0488 327/517 |
| 2014/0062914 A1* | 3/2014 | Lin | G06F 3/0485 345/173 |
| 2014/0145945 A1* | 5/2014 | Shin | G06F 3/041 345/157 |

* cited by examiner

*Primary Examiner* — Amare Mengistu
*Assistant Examiner* — Jennifer Zubajlo

(57) ABSTRACT

A multi-touch remote control method comprises following steps: a remote control device receiving a touch gesture input; computing a number of the touch points of the touch gesture input; generating and transferring a mouse event data to a receiving device as a mouse input if the number of the touch points is 1; and generating and transferring a single touch event data to the receiving device as a single touch input if the number of the touch points is greater than 1 and all the touch points of the touch gesture input are close to each other.

9 Claims, 8 Drawing Sheets

MULTI-TOUCH REMOTE CONTROL METHOD

BACKGROUND OF THE INVENTION

Field of the Invention

The technical field relates to remote control method and more particularly related to multi-touch remote control method.

DESCRIPTION OF RELATED ART

There are numerous Smart TV devices on the market today, such as Apple TV, Amazon Fire TV, Google TV, Android TV and other embedded Smart TV devices. The Smart TV devices are capable of running apps (applications). When running the app, the user can input an operation or command for controlling the app to perform a function (such as playing music, displaying photos) by using the remote control mechanisms, such as push button, D-pad, mouse or trackpad.

Because many apps for Smart TV devices are unmodified or slightly modified from mobile apps or PC applications, just like the mobile apps or the PC applications, these apps for Smart TV devices natively recognize touch inputs or mouse inputs. However, the aforementioned remote control device don't simultaneously support touch inputs and mouse inputs that these apps recognize. As a result, functions of apps for Smart TV devices are limited by the remote control mechanisms that do not simultaneously supporting the touch inputs and mouse input.

Therefore, there is a need to find out a better and more effective solution to handle such problems.

SUMMARY OF THE INVENTION

The disclosure is directed to a multi-touch remote control method for conveniently switching the input methods back and forth between mouse and multi-touch modes.

One of the exemplary embodiments, a multi-touch remote control method comprises following steps: a) a remote control device receiving a touch gesture input; b) computing a number of the touch points of the touch gesture input; c) generating and transferring a mouse event data to a receiving device as a mouse input if the number of the touch points is 1; and d) generating and transferring a single touch event data to the receiving device as a single touch input if the number of the touch points is greater than 1 and all the touch points of the touch gesture input are close to each other.

One of the exemplary embodiments, a multi-touch remote control method comprises following steps: a) a remote control device receiving a touch gesture input; b) computing a number of the touch points of the touch gesture input; c) generating and transferring a single touch event data to a receiving device as a single touch input if the number of the touch points is 1; and d) generating and transferring a mouse event data to the receiving device as a mouse input if the number of the touch points is greater than 1 and all the touch points of the touch gesture input are close to each other.

One of the exemplary embodiments, a multi-touch remote control method comprises following steps: a) a remote control device receiving and transferring a touch gesture input to a receiving device; b) the receiving device computing a number of the touch points of the touch gesture input; c) generating a mouse event data as a mouse input if the number of the touch points is 1; and d) generating a single touch event data as a single touch input if the number of the touch points is greater than 1 and all the touch points of the touch gesture input are close to each other.

This disclosed example can effectively provide a user-friendly multi-touch remote control mechanism making the user conveniently switch between a mouse mode and a single touch mode for inputting a mouse input or a touch input.

This disclosed example can allow the users to interact with majority of touch-based Smart TV apps without taking his/her eyes off the TV screen.

DETAILED DESCRIPTION OF EMBODIMENT

In the following description, a preferred embodiment is explained with associated drawings.

Figure 1:
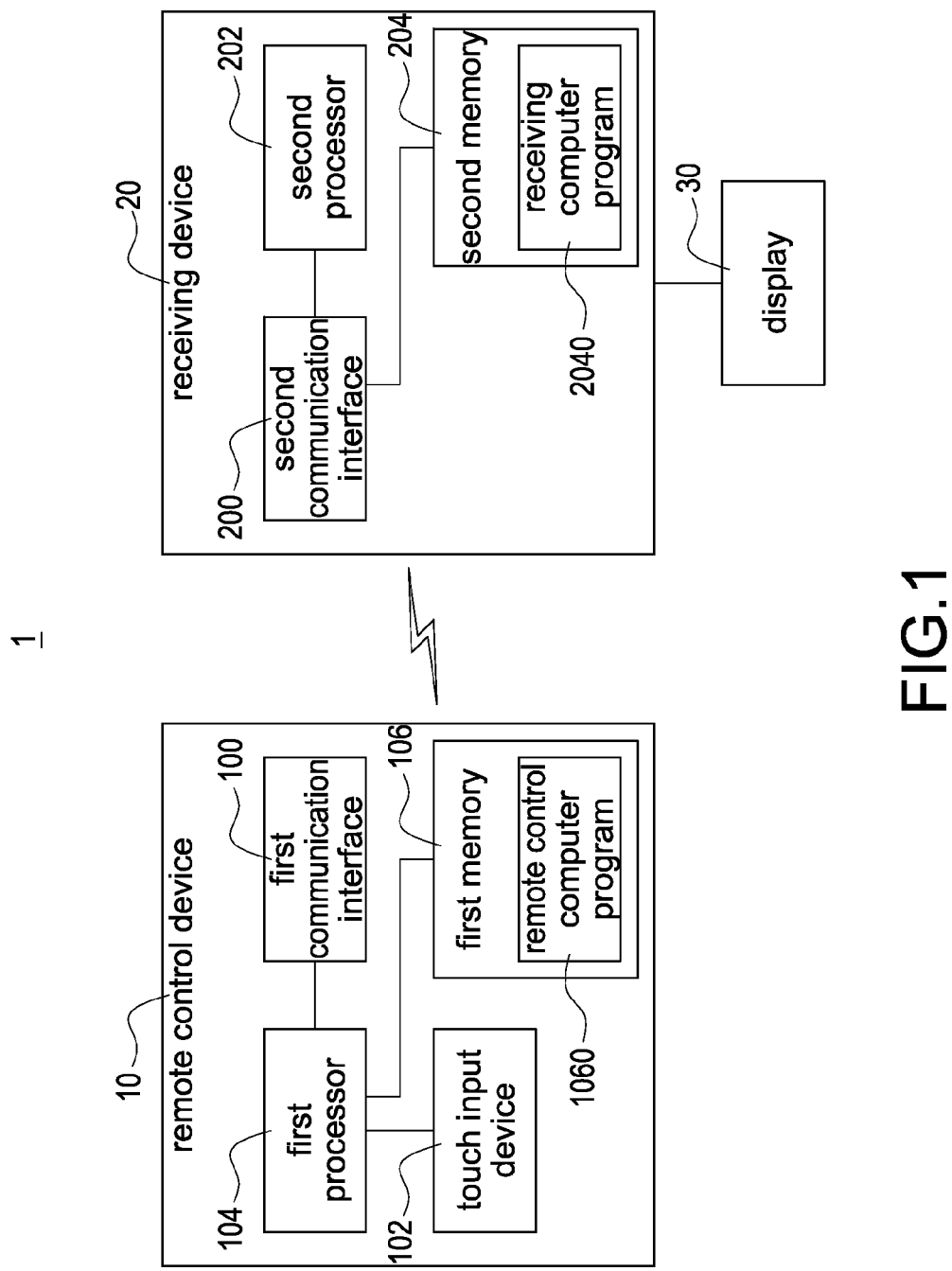
FIG. 1 is an architecture diagram of a multi-touch remote control system according to a first embodiment of the disclosed example.

First, please refer to FIG. 1, which shows an architecture diagram of a multi-touch remote control system 1 for implementing the multi-touch remote control method according to a first embodiment of the disclosed example. As illustrated in FIG. 1, the multi-touch remote control system 1 may comprise a remote control device 10 and a receiving device 20.

The remote control device 10 mainly comprises a first communication interface 100, a touch input device 102 and a first processor 104. Preferably, the remote control device 10 is a mobile device, such as smartphone or tablet PC, but this specific example is not intended to limit the scope of the disclosed example.

The first communication interface 100 is used to establish a data connection with an external electronic device and transfer data to the external electronic device. Preferably, the first communication interface 100 is Bluetooth transmitter, Wi-Fi transmitter or Zigbee transmitter, but this specific example is not intended to limit the scope of the disclosed example.

The touch input device 102 is used to receive a touch gesture input from a user. More specifically, the touch input device 102 is capable of receiving the touch gesture input (the touch gesture input can be a single touch gesture input or a multi-touch gesture input) and translating the touch gesture input into a touch data (such as the tracks or the coordinate values of the touch points of the touch gesture input) for processing and/or storing.

Preferably, the touch input device 102 is touchscreen, trackpad or the other physical input devices with physically-touchable area, but this specific example is not intended to limit the scope of the disclosed example.

In another embodiment of the disclosed example, the touch input device 102 can't directly provide physical touch function. The touch input device 102 achieves the touch function via creating a virtual touch zone in air or on a plane (such as desktop). More specifically, the touch input device 102 is the device which can detect the positions or tracks of the user's fingers in the virtual touch zone. When the user moves his/her finger(s) in the virtual touch zone for inputting the touch gesture input, the touch input device 102 of this embodiment can continuously recognize and obtain the position(s) or the track(s) of the moving finger(s), and can make the obtained positions or the obtained tracks as the touch data translated from the touch gesture input.

Preferably, the touch input device 102 of this embodiment is an image capture device, such as optical image capture device (such as camera or dual cameras), infrared image capture device, thermal image capture device or ultrasound image capture device. Preferably, the image capture device is a standalone system or built-in a mobile device.

When the touch input device 102 of this embodiment is image capture device, the user can move his/her finger(s) in the virtual touch zone (In this example, the virtual touch zone means the shooting scope of the image capture device.) for inputting the touch gesture input. In the process of moving the finger(s), the touch input device 102 can continuously capture the image of the virtual touch zone. The touch input device 102 recognizes the captured images to obtain the position(s) or the track(s) of the user's finger(s), and uses the obtained positions or the obtained track(s) as the touch data for processing and/or storing. Thus, the user can input the touch gesture input in the imaginative virtual touch zone in the air or on the plane as inputs on the physical touchpad.

The first processor 104 electrically connected to the first communication interface 100 and the touch input device 102 is used to control the remote control device 10. The first processor 104 can compute a number of the touch point(s) of the touch gesture input received by the touch input device 102. If the number of the touch point(s) is 1, the first processor 104 switches to a mouse mode and generates a mouse event data according to the touch data translated from the touch gesture input. Then, the first processor 104 transfers the generated mouse event data to outside as a mouse input via the first communication interface 100. If the number of the touch points is greater than 1 and all the touch points of the touch gesture input are close to each other, the first processor 104 switches to a single touch mode, and generates a touch event data according to the touch data translated from the touch gesture input. Then, the first processor 104 transfers the generated single touch event data to outside as a single touch input via the first communication interface 100.

On the other hand, the touch gesture inputs can be mapped to the mouse event data or the single touch event data according to the number of the touch points and whether all the touch points of the touch gesture input are close to each other.

Please be noted that the mouse event data is used to indicate at least one mouse event, such as mousedown event, mouseup event, mouseclick event and/or mousemove event.

The receiving device 20 electrically connected to a display 30 mainly comprises a second communication interface 200 and a second processor 202. Preferably, the receiving device 20 is a set-top box, TV dongle or a control box of a Smart TV, but this specific example is not intended to limit the scope of the disclosed example.

The second communication interface 200 is used to establish a data connection with the remote control device 10 via network, and is used to receive the mouse event data or the single touch event data from the remote control device 10. Preferably, the second communication interface 200 is Bluetooth transmitter, Wi-Fi transmitter or Zigbee transmitter, but this specific example is not intended to limit the scope of the disclosed example.

The second processor 202 electrically connected to the second communication interface 200 is used to control the receiving device 20. The second processor 202 can retrieve the received mouse event data via the second communication interface 200, and make the received mouse event data as the mouse input to perform a predefined function (such as controlling a mouse cursor and displaying a mouse cursor icon corresponding to the mouse cursor on the display 30).

Or, the second processor 202 can retrieve the received single touch event data via the second communication interface 200, and make the received single touch event data as the single touch input to perform another predefined function (such as drawing a pattern).

Thus, the multi-touch remote control system 1 of the disclosed example can simultaneously support touch inputs and mouse inputs.

In another embodiment of the disclosed example, the touch input device 102 is the touchscreen supporting multi-touch. The remote control device 10 receives a display data from the receiving device 20, and displays the received display data on the touch input device 102. For example, if the display data is a GUI (graphical user interface) data, the remote control device 10 can process the received GUI data, and display a GUI on the touch input device 102.

In another embodiment of the disclosed example, if the receiving device 20 receives the mouse event data (on the other hand, the first processor 104 is under the mouse mode.), the receiving device 20 can further display an enable mouse cursor icon (such as an open hand icon or an arrow icon) on the display 30 for indicating the user that the touch gesture input which the user inputs now will be mapped to the mouse event. If the receiving device 20 receives the single touch event data (on the other hand, the first processor 104 is under the single touch mode.), the receiving device 20 can further display a disable mouse cursor icon (such as an closed hand icon or a X icon) on the display 30 for indicating the user that the inputting touch gesture input which the user inputs now will be mapped to the single touch event.

Thus, the user can obtain a feedback from the display 30, and recognize that he/she is performing the mouse input or the single touch input.

In another embodiment of the disclosed example, the first processor 104 determines whether all the touch points of the touch gesture input are close to each other according to the distances between the touch points. More specifically, the first processor 104 measures all the distances between each two adjacent touch points, and then respectively compares all the distances with a threshold. If all the distances are less than the threshold, the first processor 104 determines that all the touch points of the touch gesture input are close to each other (on the other hand, the touch gesture input is the single touch input), and generates the single touch event data.

Preferably, the threshold is 20 mm or less, but the above specific example is not intended to limit the scope of the disclosed example.

If any distance between the touch points and not less than the threshold is present, the first processor 104 determines that all the touch points of the touch gesture input are not close to each other (on the other hand, the touch gesture input is not a single touch input). Then, the first processor 104 switches to a multi-touch mode, generates a multi-touch event data, and transfers the multi-touch event data to the receiving device as a multi-touch input.

Preferably, the first processor 104 generates the single touch event data only if the number of the touch points is 2 and the two touch points are close to each other. On the other hand, the first processor 104 generates the multi-touch event data if the number of the touch points is greater than 2 or the distance between the two touch points is not less than the threshold.

In another embodiment of the disclosed example, the first processor 104 retrieves a coordinate value of one of the touch points as a touch point coordinate value of the single touch event data. More specifically, each touch point is just corresponded to a coordinate value. The first processor 104 recognizes which touch point is corresponded to a user predefined finger (such as index finger) in the touch points, and retrieves the coordinate value of the recognized touch point as the touch point coordinate value. Thus, the user can clearly know that the track of the finger (such as index finger) is corresponded to the track of the single touch input.

In another embodiment of the disclosed example, the remote control device 104 computes the touch point coordinate value of the single touch event data according to the coordinate values of the touch points. More specifically, each touch point is just corresponded to the coordinate value. The first processor 104 recognizes/selects at least two touch points from the touch points, and retrieves their coordinate values. Then, the first processor 104 computes the touch point coordinate value (such as incenter coordinate value, circumcenter coordinate value or orthocenter coordinate value) according to the retrieves coordinate values. Thus, the user can clearly know that the track of the center point between the fingers is corresponded to the track of the single touch input.

In another embodiment of the disclosed example, the first processor 104 generates the single touch event data when the touch gesture input comprises a double click gesture input. More specifically, the first processor 104 retrieves the touch data translated from the touch gesture input, and determines whether the touch data comprises a double click data corresponding to the double click gesture input via analyzing the touch data. If the touch data comprises the double click data, the first processor 104 switches to the single touch mode and generates the single touch event data even the number of the touch input is 1. Preferably, the touch gesture input further comprises a single touch input immediately followed the double click gesture input, the generated single touch event data is corresponded to the single touch input.

On the other hand, the first processor 104 first determines that the touch gesture input comprises the double click gesture input. If the touch gesture input comprises the double click gesture input, the first processor 104 switches to the single touch mode. If the touch gesture input does not comprise the double click gesture input, the first processor 104 secondly determines whether the touch gesture input is the mouse event input according to the computed number of the touch input. Thus, the user can conveniently selectively perform the mouse input or the single touch input via using only one finger.

In another embodiment of the disclosed example, the remote control device 10 only receives the touch gesture input and transfers the received touch gesture input to the receiving device 20. The other functions or procedures as mentioned previously (such as computing the number of the touch points, or generating the mouse event data or the single touch event data according to the number) are performed by the receiving device 20.

In another embodiment of the disclosed example, the multi-touch remote control system 1 generates the single touch event data when the number of the touch points is 1, and generates the mouse event data when the number of the touch points is greater than 1 and all the touch points of the touch gesture input are close to each other.

In another embodiment of the disclosed example, the remote control device 10 further comprises a first memory 106. The first memory 106 stores a remote control computer program 1060. The receiving device 20 further comprises a second memory 204. The second memory 204 stores a receiving computer program 2040. When the first processor 106 executes the remote control computer program 1060 and the second processor 202 executes the receiving computer program 2040, the multi-touch remote control system 1 can perform the steps of the multi-touch remote control method described later.

Figure 2:
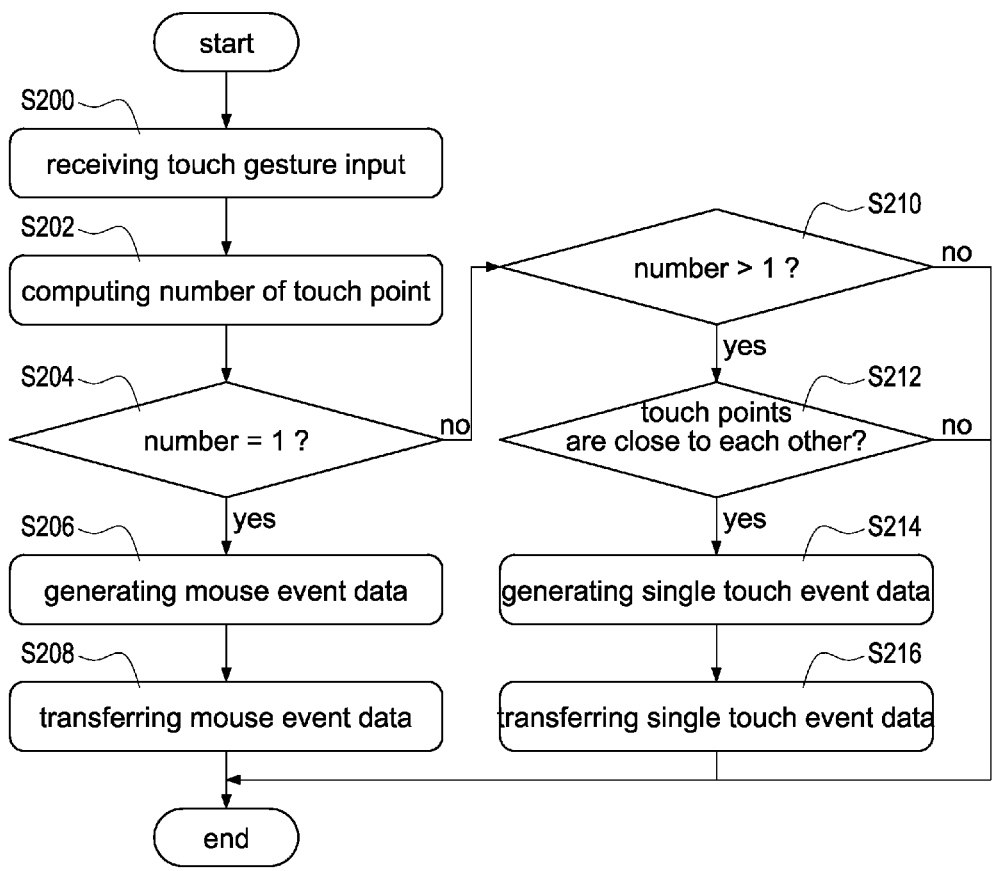
FIG. 2 is a flowchart of a multi-touch remote control method according to the first embodiment of the disclosed example.

Please refer to FIG. 2, which is a flowchart of a multi-touch remote control method according to the first embodiment of the disclosed example. The multi-touch remote control method in this embodiment is mainly implemented by the multi-touch remote control system 1 as illustrated in FIG. 1. After the first processor 106 executes the remote control computer program 1060 and the second processor 202 executes the receiving computer program 2040, the following steps are performed.

Step S200: receive the touch gesture input. More specifically, the remote control device 10 receives the touch gesture input from the user. The touch gesture input can be a single touch gesture input or a multi-touch gesture input. Preferably, the remote control device 10 further translates the received touch gesture input into the touch data.

Step S202: computer the number of the touch points. Preferably, the remote control device 10 computer the number of the touch points of touch gesture input according to the translated touch data.

Step S204: determine whether the number of the touch points of touch gesture input is 1. If the number is 1, the remote control device 10 performs the step S206. Otherwise (the number is not 1), the remote control device 10 performs the step S210.

Step S206: generate the mouse event data. Preferably, the remote control device 10 switches to the mouse mode, and generates the mouse event data according to the touch data translated from the touch gesture input.

Step S208: the remote control device 10 transfer the generated mouse event data to the receiving device 20.

If the number of the touch points is not 1 in the step S204, the remote control device 10 performs the step S210.

Step S210: determine whether the number of the touch points of touch gesture input is greater than 1. If the number is greater than 1, the remote control device 10 performs the step S212. Otherwise, the multi-touch remote control method is terminated.

Step S212: determine whether the touch points are close to each other. If the touch points are close to each other, the remote control device 10 performs the step S214. Otherwise, the multi-touch remote control method is terminated.

Step S214: generate the single touch event data. Preferably, the remote control device 10 switches to the single touch mode, and generates the single touch event data according to the touch data translated from the touch gesture input.

In another embodiment of the disclosed example, the remote control device 10 computes the touch point coordinate of the single touch event data according to the coordinate values of the touch points, but the above specific example is not intended to limit the scope of the disclosed example.

In another embodiment of the disclosed example, the remote control device 10 retrieves the coordinate value of one of the touch points as the touch point coordinate of the single touch event data.

Step S216: the remote control device 10 transfers the generated single touch event data to the receiving device 20.

Figure 3:
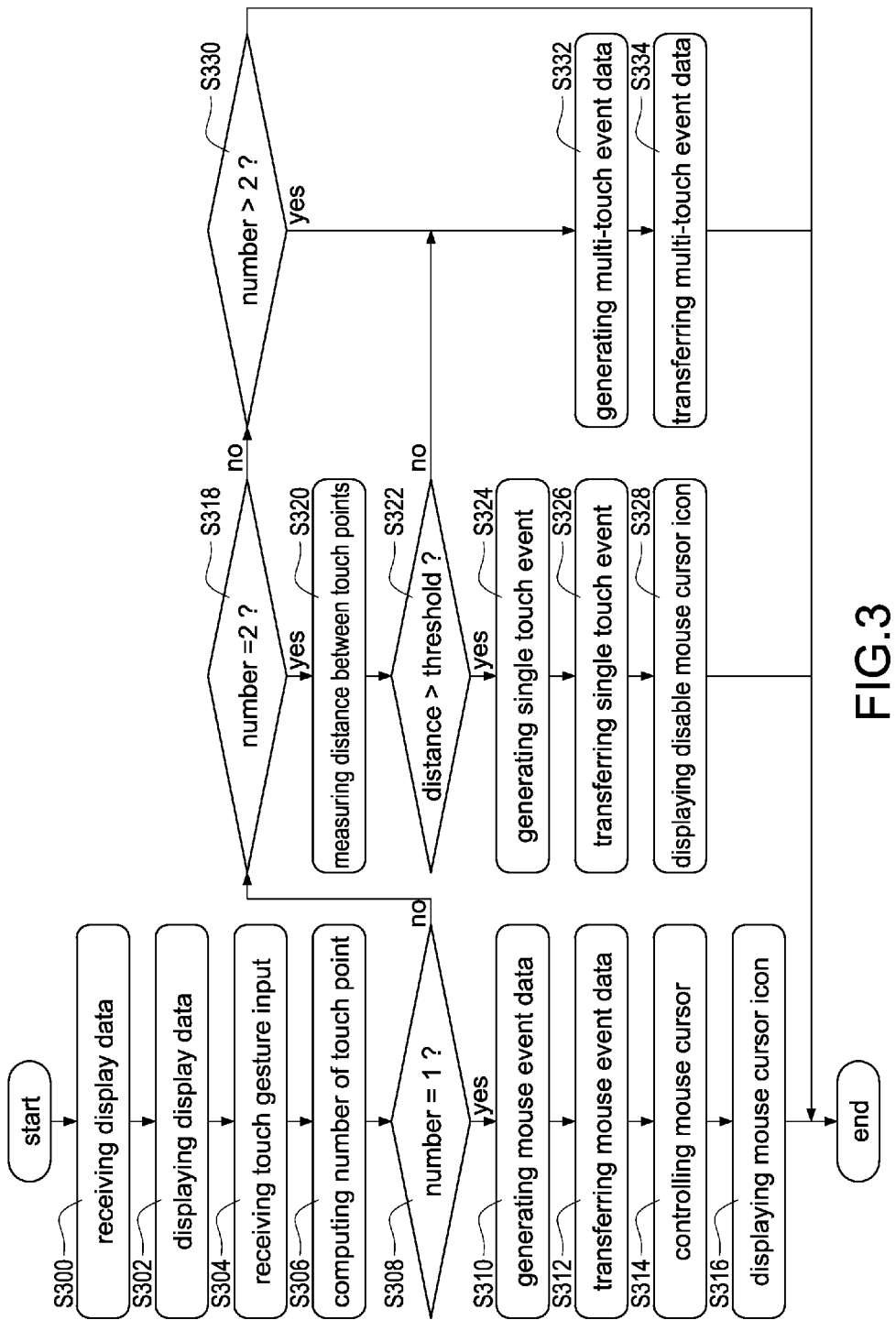
FIG. 3 is a flowchart of a multi-touch remote control method according to the second embodiment of the disclosed example.

Please refer to FIG. 3, which is a flowchart of a multi-touch remote control method according to the second embodiment of the disclosed example. The multi-touch remote control method in this embodiment is mainly implemented by the multi-touch remote control system 1 as illustrated in FIG. 1. After the first processor 106 executes the remote control computer program 1060 and the second processor 202 executes the receiving computer program 2040, the following steps are performed.

Step S300: receive the display data. Preferably, the display data is a GUI data, the remote control device 10 receives the display data from the receiving device 20.

Step S302: display the display data. Preferably, the remote control device 10 can process the received GUI data, and display the GUI in the touch input device 102.

Step S304: receive the touch gesture input.

Step S306: compute the number of the touch points of the touch gesture input.

Step S308: determine whether the number of the touch points of touch gesture input is 1. If the number is 1, the remote control device 10 performs the step S310. Otherwise (the number is not 1), the remote control device 10 performs the step S318.

Step S310: generate the mouse event data.

Step S312: transfer the mouse event data to the receiving device 20.

Step S314: control the mouse cursor. Preferably, the receiving device 20 controls the mouse cursor according to the received mouse event data.

Step S316: display the mouse cursor icon. More specifically, the receiving device 20 displays the mouse cursor icon corresponding to the mouse cursor on the display 30. Preferably, the mouse cursor icon is the enable mouse cursor icon (such as an open hand icon or an arrow icon).

If the number of the touch points is not 1 in the step S308, the remote control device 10 performs the step S318.

Step S318: determine whether the number of the touch points of the touch gesture input is 2. If the number is 2, the remote control device 10 performs the step S320. Otherwise, perform the step S330.

Step S320: measure the distance between the touch points. Preferably, the remote control device 10 measures the distance between the two touch points of the touch gesture input.

Step S322: determine whether the distance is less than the threshold. If the measured distance is less than the threshold, the remote control device 10 performs the step S324. Otherwise, perform the step S332.

Step S324: generate the single touch event data.

Step S326: transfer the single touch event data to the receiving device 20.

Step S328: display the disable mouse cursor icon on the display 30. Preferably, the mouse cursor icon is the closed hand icon or the X icon.

If the number of the touch points is neither 1 nor 2 in the step S318, the remote control device 10 performs the step S330.

Step S330: determine whether the number of the touch points of touch gesture input is greater than 2. If the number is greater than 2, the remote control device 10 performs the step S332. Otherwise, the multi-touch remote control method is terminated.

Step S332: generate the multi-touch event data. Preferably, the remote control device 10 switches to the multi-touch mode, and generates the multi-touch event data according to the touch data translated from the touch gesture input.

Step S334: the remote control device 10 transfer the generated multi-touch event data to the receiving device 20.

Figure 4:
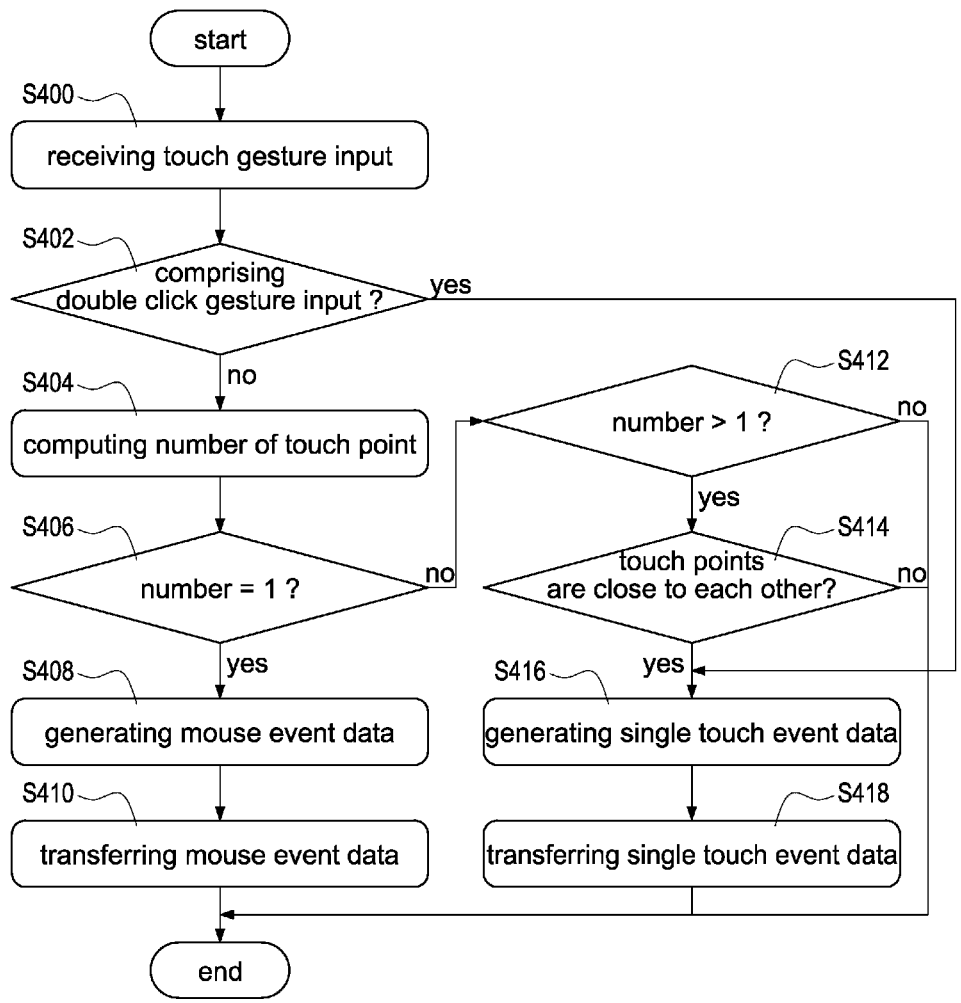
FIG. 4 is a flowchart of a multi-touch remote control method according to the third embodiment of the disclosed example.

Please refer to FIG. 4, which is a flowchart of a multi-touch remote control method according to the third embodiment of the disclosed example. The multi-touch remote control method in this embodiment is mainly implemented by the multi-touch remote control system 1 as illustrated in FIG. 1. After the first processor 106 executes the remote control computer program 1060 and the second processor 202 executes the receiving computer program 2040, the following steps are performed.

Step S400: receive the touch gesture input

Step S402: determine whether the touch gesture input comprises the double click gesture input. If the touch gesture input comprises the double click gesture input, the remote control device 10 performs the step S416. Otherwise, perform the step S404.

The steps S404-S418 are similar to the steps S202-S216 shown in FIG. 2 respectively, the relevant description is omitted for brevity.

Figure 5:
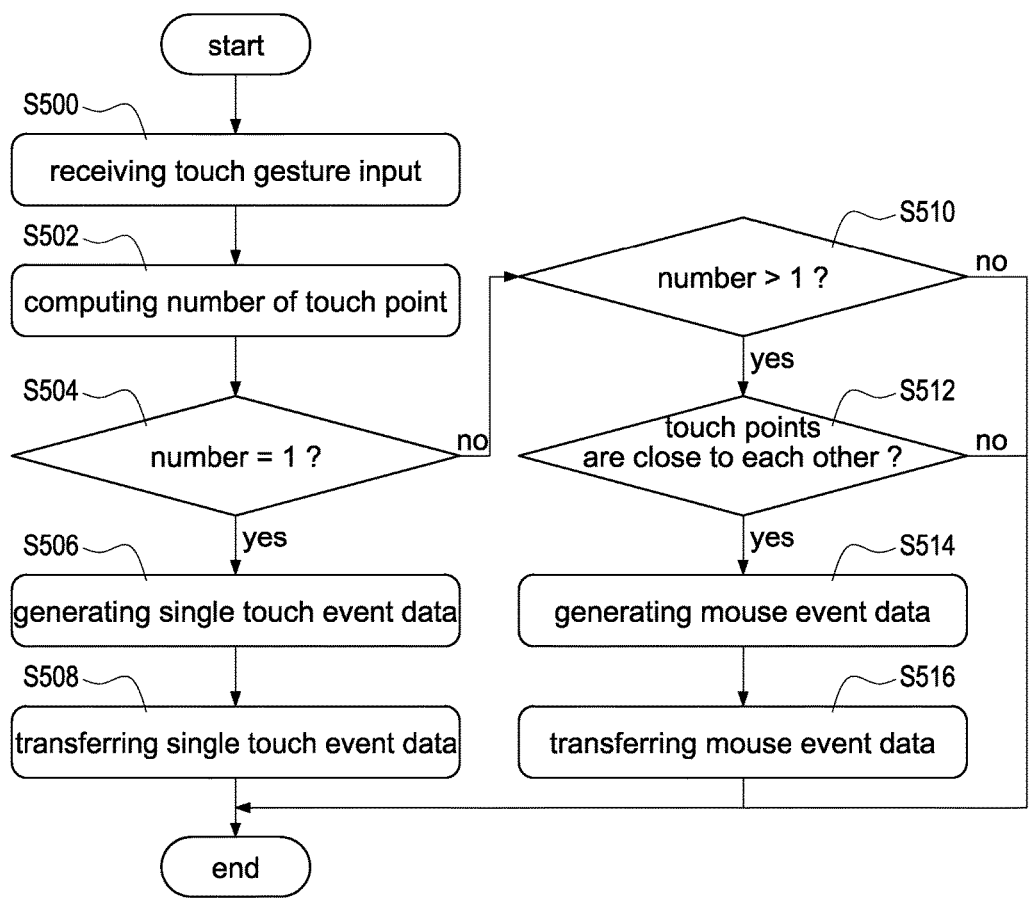
FIG. 5 is a flowchart of a multi-touch remote control method according to the forth embodiment of the disclosed example.

Please refer to FIG. 5, which is a flowchart of a multi-touch remote control method according to the forth embodiment of the disclosed example. The multi-touch remote control method in this embodiment is mainly implemented by the multi-touch remote control system 1 as illustrated in FIG. 1. After the first processor 106 executes the remote control computer program 1060 and the second processor 202 executes the receiving computer program 2040, the following steps are performed.

In this embodiment, the remote control device 10 generates the single touch event data if the number of the touch points is 1, and generates the mouse event data if the number of the touch points is greater than 1 and all the touch points are close to each other.

The steps S500-S504 are similar to the steps S200-S204 shown in FIG. 2 respectively, the relevant description is omitted for brevity.

If the number of the touch points is 1 in the step S504, the remote control device 10 performs the step S506.

Step S506: generate the single touch event data.

Step S508: transfer the single touch event data.

The steps S510-S512 are similar to the steps S210-S212 shown in FIG. 2 respectively, the relevant description is omitted for brevity.

Step S514: generate the mouse event data.

Step S516: transfer the mouse event data.

Figure 6:
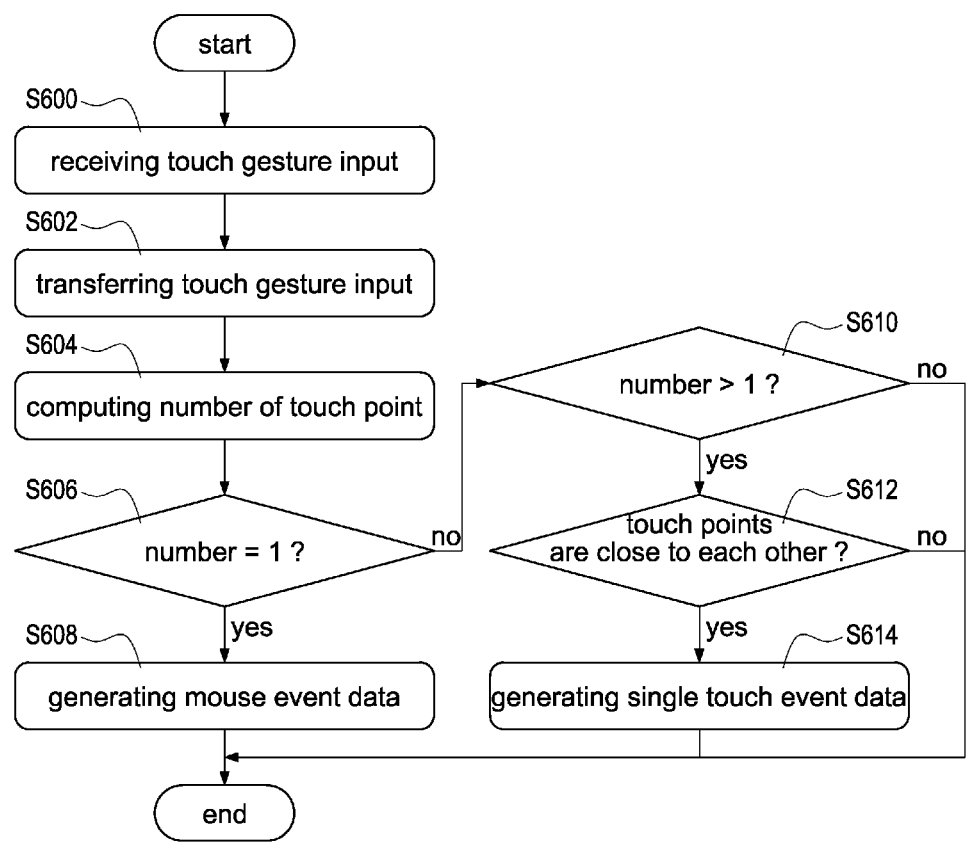
FIG. 6 is a flowchart of a multi-touch remote control method according to the fifth embodiment of the disclosed example.

Please refer to FIG. 6, which is a flowchart of a multi-touch remote control method according to the fifth embodiment of the disclosed example. The multi-touch remote control method in this embodiment is mainly implemented by the multi-touch remote control system 1 as illustrated in FIG. 1. After the first processor 106 executes the remote control computer program 1060 and the second processor 202 executes the receiving computer program 2040, the following steps are performed.

In this embodiment, the remote control device 10 only performs the steps S600-S602. The other steps S604-S614 are performed by the receiving device 20.

Step S600: the remote control device 10 receives the touch gesture input.

Step S602: the remote control device 10 transfers the received touch gesture input to the receiving device 20.

Step S604: the receiving device 20 computers the number of the touch points.

Step S606: the receiving device 20 determines whether the number of the touch points of touch gesture input is 1. If the number is 1, the receiving device 20 performs the step S608. Otherwise (the number is not 1), the receiving device 20 performs the step S610.

Step S608: the receiving device 20 generates the mouse event data.

If the number of the touch points is not 1 in the step S606, the receiving device 20 performs the step S610.

Step S610: the receiving device 20 determines whether the number of the touch points of touch gesture input is greater than 1. If the number is greater than 1, the remote control device 10 performs the step S612. Otherwise, the multi-touch remote control method is terminated.

Step S612: the receiving device 20 determines whether the touch points are close to each other. If the touch points are close to each other, the remote control device 10 performs the step S614. Otherwise, the multi-touch remote control method is terminated.

Step S614: the receiving device 20 generates the single touch event data.

Figure 7A:
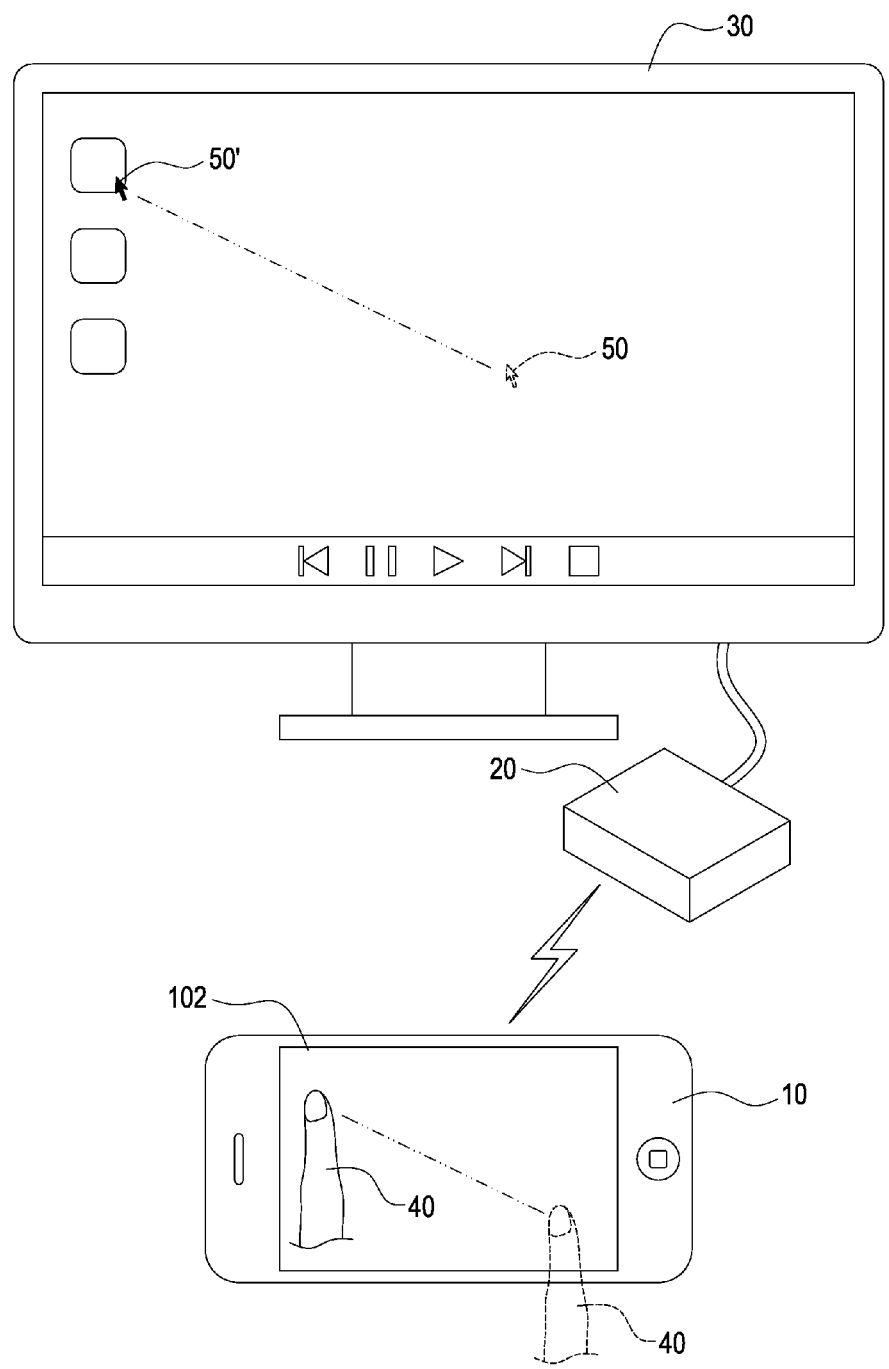
FIG. 7A is a schematic view of the mouse mode according to the first embodiment of the disclosed example.

Please refer to the FIG. 7A. FIG. 7A is a schematic view of the mouse mode according to the first embodiment of the disclosed example. In this case, the remote control device 10 is a smartphone, the touch input device 102 is a touchscreen, and the receiving device 20 is a set-top box.

As shown in FIG. 7A, the receiving device 20 is running a player app. When the remote control device 10 executes the remote control computer program 1060 and the receiving device 20 executes the receiving computer program 2040, the remote control device 10 can establish a connection with the receiving device 20.

After the connection is established, the user can use his/her index finger 40 to input the touch input (such as moving index finger 14 from the lower right to upper left) on the touch input device 120 of the remote control device 10.

Then, the remote control device 10 generates the mouse event data according to the touch input. And the remote control device 10 transfers the generated mouse event data to the receiving device 20.

Finally, the receiving device 20 controls the mouse cursor to move from the location of the mouse cursor icon 50 to the location of the mouse cursor icon 50' on the display 30 according to the received mouse event data. Thus, the user can input the touch input to the remote control device 10 for controlling the mouse cursor as using mouse.

Figure 7B:
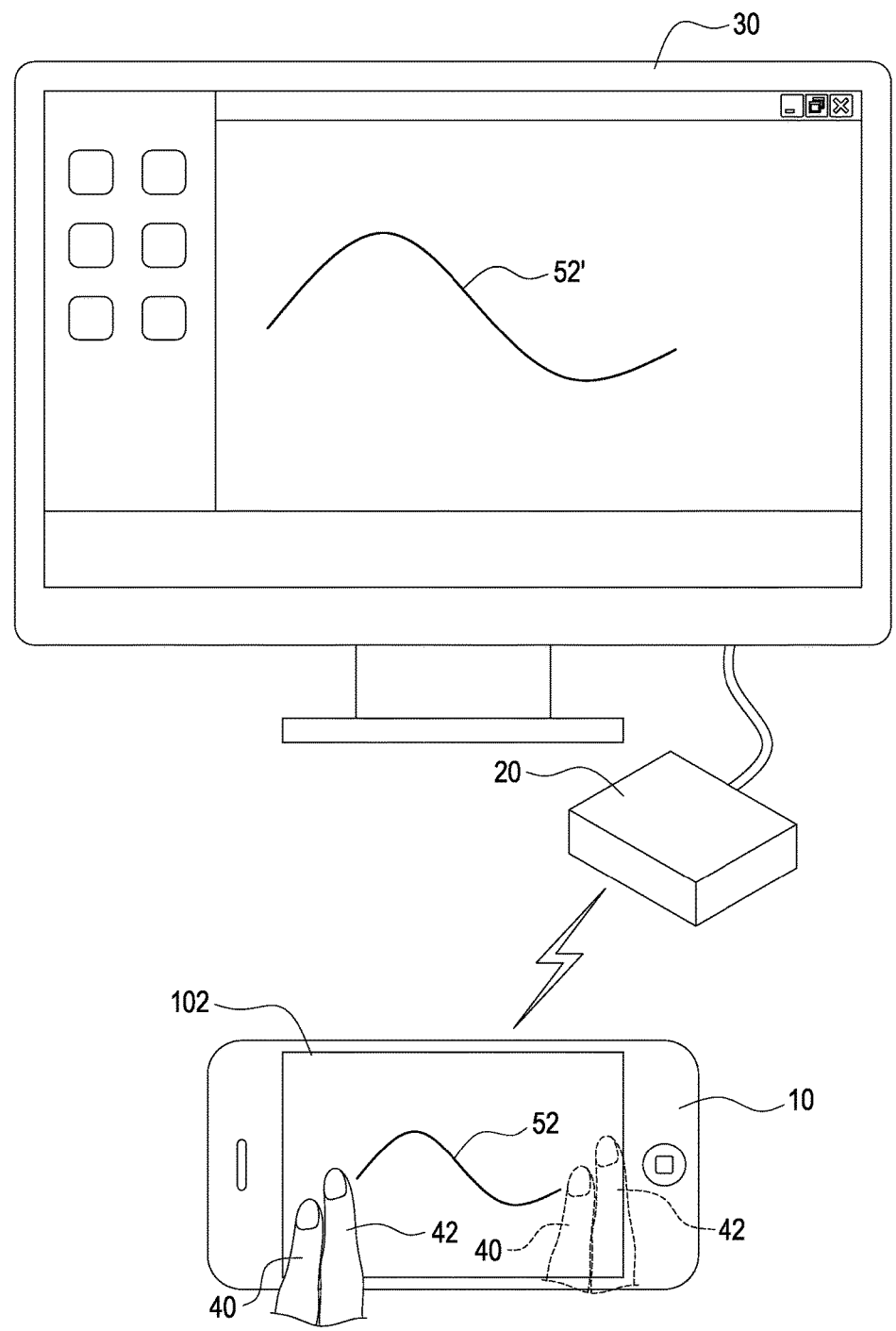
FIG. 7B is a schematic view of the single touch mode according to the first embodiment of the disclosed example.

Please refer to the FIG. 7B. FIG. 7B is a schematic view of the single touch mode according to the first embodiment of the disclosed example. In this case, the remote control device 10 is a smartphone, the touch input device 102 is a touchscreen, and the receiving device 20 is a set-top box.

As shown in FIG. 7B, the receiving device 20 is running a drawing app. When the remote control device 10 executes the remote control computer program 1060 and the receiving device 20 executes the receiving computer program 2040, the remote control device 10 can establish a connection with the receiving device 20.

After the connection is established, the user can simultaneously use his/her index finger 40 and middle finger 42 to input the touch input (such as drawing a curve 52) on the touch input device 102 of the remote control device 10.

Then, the remote control device 10 generates the single touch event data according to the touch input. And the remote control device 10 transfers the generated single touch event data to the receiving device 20.

Finally, the receiving device 20 draws a curve 52' according to the received single touch event and displays the curve 52' on the display 30. Thus, the user can input the touch input on the remote control device 10 to draw the pattern as inputting the touch input on the display 30.

This disclosed example can effectively provide a high-adaptive remote control mechanism, and provide better user experience via making the different touch gesture inputs respectively map to the different event inputs.

This disclosed example can effectively provide a user-friendly multi-touch remote control mechanism leading the user conveniently switch between a mouse mode and a single touch mode for inputting a mouse input or a single touch input.

This disclosed example can make the users conveniently switch the input methods back and forth between mouse and multi-touch modes, therefore, this disclosed example can allow the users to interact with majority of touch-based Smart TV apps without taking his/her eyes off the TV screen.

What is claimed is:

1. A multi-touch remote control method, comprising following steps:
    a) a remote control device receiving a touch gesture input;
    b) computing a number of at least one touch point of the touch gesture input and retrieving a coordinate value of the touch point of the touch gesture;
    c) determining that the touch gesture input is a mouse input, generating mouse event data according to the retrieved coordinate value of the touch point of the touch gesture, and transferring the mouse event data to a receiving device if the number is 1;
    d) measuring a coordinate distance between every two adjacent touch points if the number is greater than 1;
    e) determining that the touch gesture input is a single touch input if the number is greater than 1 and the coordinate distance is less than a threshold, recognizing one of the touch points of the touch gesture input corresponding to a user predefined finger and making the retrieved coordinate value of the recognized touch point of the touch gesture input as a touch point coordinate value of the single touch input, or computing an incenter coordinate value, a circumcenter coordinate value or an orthocenter coordinate value according to the retrieved coordinate values of the touch points of the touch gesture input as the touch point coordinate value of the single touch input;
    f) generating single touch event data according to the touch point coordinate value of the single touch input, and transferring the single touch event data to the receiving device; and
    g) determining that the touch gesture input is a multi-touch input, generating multi-touch even data according to the retrieved coordinate values of the touch points of the touch gesture, and transferring the multi-touch event data to the receiving device if the number is greater than 1 and any coordinate distance is not less than the threshold, wherein the coordinate distance between every two adjacent touch points is greater than zero.

2. The multi-touch remote control method according to claim 1, further comprising following steps before the step a):

a1) receiving display data from the receiving device; and a2) displaying the display data in a touchscreen of the remote control device.

3. The multi-touch remote control method according to claim 1, further comprising following steps after the step c):

c1) the receiving device controlling a mouse cursor according to the mouse event; and c2) displaying a mouse cursor icon corresponding to the mouse cursor on a display.

4. The multi-touch remote control method according to claim 1, further comprising following step after the step d):

d1) the receiving device displaying a disable mouse cursor icon on a display.

5. The multi-touch remote control method according to claim 1, wherein the step d) is to measure the distance between the two adjacent touch points if the number of the touch points is 2, the step e) is to determine that the touch gesture input is the single touch input if the number of the touch points is 2 and the distance is less than the, the step g) is to determine that the touch gesture input is the multi-touch input, generating and transferring the multi-touch event data to the receiving device if the number of the touch points is 2 and the distance is not less than the threshold.

6. The multi-touch remote control method according to claim 5, further comprising following step:

h) determining that the touch gesture input is the multi-touch input, generating and transferring the multi-touch event data to the receiving device if the number of the touch points is greater than 2.

7. The multi-touch remote control method according to claim 1, further comprising following step after the step a):

i) generating and transferring the single touch event data to the receiving device as the single touch input if the touch gesture input comprises a double click gesture input.

8. A multi-touch remote control method, comprising following steps:

a) a remote control device receiving a touch gesture input;

b) computing a number of at least one touch point of the touch gesture input and retrieving a coordinate value of the touch point of the touch gesture;

c) determining that the touch gesture input is a single touch input, generating single touch event data according to the retrieved coordinate value of the touch point of the touch gesture, and transferring the single touch event data to a receiving device if the number is 1;

d) measuring a coordinate distance between every two adjacent touch points if the number is greater than 1;

e) determining that the touch gesture input is a mouse input if the number is greater than 1 and the coordinate distance is less than a threshold, recognizing one of the touch points of the touch gesture input corresponding to a user predefined finger and making the retrieved coordinate value of the recognized touch point of the touch gesture input as a touch point coordinate value of the mouse input, or computing an incenter coordinate value, a circumcenter coordinate value or an orthocenter coordinate value according to the retrieved coordinate values of the touch points of the touch gesture input as the touch point coordinate value of the mouse input;

f) generating mouse event data according to the touch point coordinate value of the single touch input, and transferring the mouse event data to the receiving device; and g) determining that the touch gesture input is a multi-touch input, generating multi-touch even data according to the retrieved coordinate values of the touch points of the touch gesture, and transferring the multi-touch event data to the receiving device if the number is greater than 1 and any coordinate distance is not less than the threshold, wherein the coordinate distance between every two adjacent touch points is greater than zero.

9. A multi-touch remote control method, comprising following steps:

a) a remote control device receiving and transferring a touch gesture input to a receiving device;

b) the receiving device computing a number of at least one touch point of the touch gesture input and retrieving a coordinate value of the touch point of the touch gesture;

c) determining that the touch gesture input is a mouse input, generating mouse event data according to the retrieved coordinate value of the touch point of the touch gesture if the number of the touch points is 1; and d) measuring a coordinate distance between every two adjacent touch points if the number is greater than 1;

e) determining that the touch gesture input is a single touch input if the number is greater than 1 and the coordinate distance is less than a threshold, recognizing one of the touch points of the touch gesture input corresponding to a user predefined finger and a making the retrieved coordinate value of the recognized touch point of the touch gesture input as a touch point coordinate value of the single touch input, or computing an incenter coordinate value, a circumcenter coordinate value or an orthocenter coordinate value according to the retrieved coordinate values of the touch points of the touch gesture input as the touch point coordinate value of the single touch input;

f) generating single touch event data according to the touch point coordinate value of the single touch input; and g) determining that the touch gesture input is a multi-touch input, generating multi-touch event data according to the retrieved coordinate values of the touch points of the touch gesture if the number is greater than 1 and any coordinate distance is not less than the threshold, wherein the coordinate distance between every two adjacent touch points is greater than zero.

\* \* \* \* \*